United States Patent
Muhr

(10) Patent No.: US 6,252,324 B1
(45) Date of Patent: Jun. 26, 2001

(54) METHOD OF WINDING A ROTATING INDUCTION APPARATUS

(75) Inventor: George H. Muhr, Sudbury (CA)

(73) Assignee: Borealis Technical Limited, Horse Barrack Lane (GI)

( * ) Notice: Subject to any disclaimer, the term of this patent is extended or adjusted under 35 U.S.C. 154(b) by 0 days.

(21) Appl. No.: 09/298,255

(22) Filed: Apr. 22, 1999

(51) Int. Cl.⁷ .................................................. H02K 17/00
(52) U.S. Cl. ......................... 310/159; 310/179; 310/198
(58) Field of Search ........................... 310/179, 159, 310/184, 185, 198, 208, 195, 201; 318/700, 716

(56) References Cited

U.S. PATENT DOCUMENTS

| | | | |
|---|---|---|---|
| 2,015,562 | * | 9/1935 | Kilgore ................................. 310/202 |
| 2,745,029 | * | 5/1956 | McElligott ........................... 310/202 |
| 2,778,962 | * | 1/1957 | Taylor .................................. 310/202 |
| 2,778,963 | * | 1/1957 | Habermann .......................... 310/202 |
| 3,408,517 | * | 10/1968 | Willyoung ........................... 310/198 |
| 3,430,126 | * | 2/1969 | Richardson et al. ................... 322/90 |
| 3,601,642 | * | 8/1971 | Willyoung ............................. 310/98 |
| 3,660,705 | * | 5/1972 | Willyoung ........................... 310/198 |
| 4,028,572 | * | 6/1977 | Baltisberger ........................ 310/201 |
| 4,132,914 | * | 1/1979 | Khutoretsky et al. ............... 310/184 |
| 4,833,356 | * | 5/1989 | Bansal et al. ....................... 310/207 |
| 4,914,335 | * | 4/1990 | Horton et al. ....................... 310/207 |
| 5,654,602 | * | 8/1997 | Willyoung ........................... 310/179 |
| 5,719,453 | * | 2/1998 | Horst ................................. 310/68 R |
| 5,998,903 | * | 12/1999 | Umeda et al. ....................... 310/179 |
| 6,025,691 | * | 2/2000 | Kawabata et al. .................. 318/700 |
| 6,049,152 | * | 4/2000 | Nakano ............................... 310/114 |
| 6,051,898 | * | 4/2000 | Sakamoto .......................... 310/49 R |
| 6,054,837 | * | 4/2000 | Edelson .............................. 318/801 |

* cited by examiner

Primary Examiner—Joseph Waks
(74) Attorney, Agent, or Firm—Baker Botts L.L.P.

(57) ABSTRACT

A method of winding an electrical rotating apparatus includes determining a desired number of phases that is output from an electrical rotating apparatus, with the number of phases being greater than three. A stator is provided and additionally, a rotor is provided such that the rotor is electromagnetically coupled to a magnetic field generated by the stator. A plurality of coils is also provided, with the plurality of coils including a first coil and a second coil. The plurality of coils are wound around the stator, with the first coil being placed on the right side of the stator and the second coil being placed on the left side of the stator.

25 Claims, 6 Drawing Sheets

METHOD OF WINDING A ROTATING INDUCTION APPARATUS

TECHNICAL FIELD OF THE INVENTION

This invention relates generally to a rotating induction apparatus and more specifically to a method of winding a rotating induction apparatus.

BACKGROUND OF THE INVENTION

In a rotating induction apparatus, a current of electrical charge generated within a magnetic field experiences a force perpendicular to the flow of charge and to the lines of force of the magnetic field. If a conductor is forced through a magnetic field by an external prime mover, an electrical current is caused to flow; this is the principle of the operation of an electrical generator. When an electrical current flows through a conductor in a magnetic field, a force is applied to the conductor; this is the principle of the operation of an electrical motor.

In an alternating current (AC) rotating induction apparatus, a rotating magnetic field is produced by the stator or stationary portion of the apparatus. This rotating magnetic field interacts with current carried by conductors of the rotor, causing the rotor to turn. It also produces currents in the rotor conductors by transformer action. Thus, the rotor needs no connections to an electrical supply and is simply supported by bearings which allow free rotation.

The rotating magnetic field is produced by coils, that are made of coils of wire, suitably positioned on the stator. Each coil produces a varying magnetic field of fixed orientation when energized with an AC current. By positioning several coils of differing orientations on a single stator and energizing the coils with alternating currents of differing phase, a rotating magnetic field is produced, which is the sum of the time-varying fixed orientation magnetic fields generated by each coil per phase.

For a rotating induction apparatus having greater than three phases, the coils once wound around the stator may become cumbersome and difficult to wind. As the number of phases increases, the coils become increasingly cumbersome and difficult to wind.

SUMMARY OF THE INVENTION

Thus, a need has arisen for an improved method for winding a rotating induction apparatus.

In accordance with an embodiment of the present invention, a method of winding an electrical rotating apparatus comprises: determining a desired number of phases that is output from the electrical rotating apparatus, wherein the number of phases is greater than three; providing a stator; providing a rotor electromagnetically coupled to a magnetic field generated by the stator; providing a plurality of coils, wherein the plurality of coils includes a first coil and a second coil, wherein the plurality of coils are wound around the stator; placing the first coil on the right side of the stator; and placing the second coil on the left side of the stator.

In accordance with another embodiment of the present invention, an electrical rotating apparatus comprises: a number of phases, wherein the number of phases is output from the electrical rotating apparatus and the number of phases is greater than three; a stator; a rotor electromagnetically coupled to a magnetic field generated by the stator; and coils comprising a first coil and a second coil, wherein the first and second coils are wound around the stator, wherein the first coil is on a right side of the stator and the second coil is on a left side of the stator.

In accordance with another embodiment of the present invention, an electrical rotating apparatus comprises: a number of phases, wherein the number of phases is output from the electrical rotating apparatus and the number of phases is greater than three; a stator comprising a plurality of slots greater than or equal to twice the number of phases, the plurality of slots comprising a first slot and a second slot; a rotor electromagnetically coupled to a magnetic field generated by the stator; coils that are wound around the stator, wherein the coils comprise: a first coil coupled to the first slot and the second slot; and a second coil coupled to the first slot and the second slot, wherein the first coil is on a right side of the stator and the second coil is on a left side of the stator.

A technical advantage of the present invention is that it substantially reduces the problems associated with winding a rotating induction apparatus having more than three phases. Another technical advantage of the present invention is that it spaces the coils, such that the coils are distributed evenly around the stator.

Other technical advantages of the present invention are set forth in or will be apparent from the drawings and the description of the invention which follows, or may be learned from the practice of the invention.

BRIEF DESCRIPTION OF THE DRAWINGS

For a more complete explanation of the present invention and the technical advantages thereof, reference is now made to the following description and the accompanying drawings, wherein like reference numerals represent like parts, in which.

DETAILED DESCRIPTION OF THE INVENTION

Figure 1:
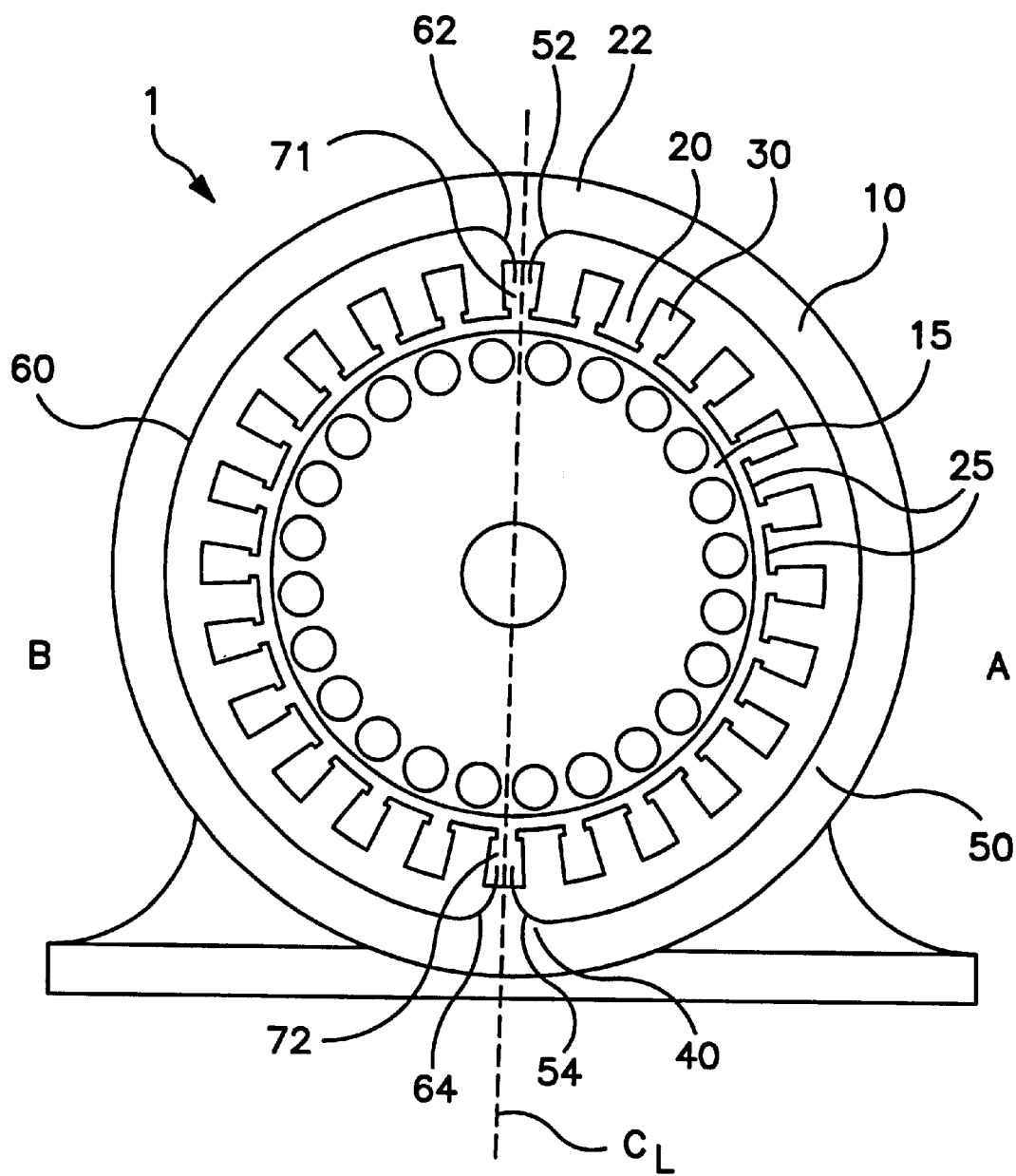
FIG. 1 illustrates a schematic of the coils of an induction apparatus of the present invention.

Referring to FIGS. 1 though 5, the present invention may utilize multiple, i.e., more than three, independently driven phases. Preferably, the apparatus uses twelve or more phases. Alternatively, the apparatus uses eighteen or more phases. For a rotating induction apparatus, the number of phases is the number of independently driven stator circuits, wherein a stator circuit is a pair of slots that coils are to be inserted. The present invention may be used with any number of desired phases that is greater than three. The number of phases, however, may depend on the structural limitations of the apparatus.

Additionally, the present invention may be used with any number of poles. The number of slots in the stator will be equivalent to the number of phases multiplied by the number of poles.

FIG. 1 illustrates a schematic of the coils on an induction apparatus of the present invention. FIG. 1 depicts a stator 10, stator teeth 20, and slots 30. Rotor 15 is electromagnetically coupled to a magnetic field generated by stator 10. Thus, there may be an airgap 25 between rotor 15 and stator 10. Coils 40 are wound around stator 10.

Figure 2:
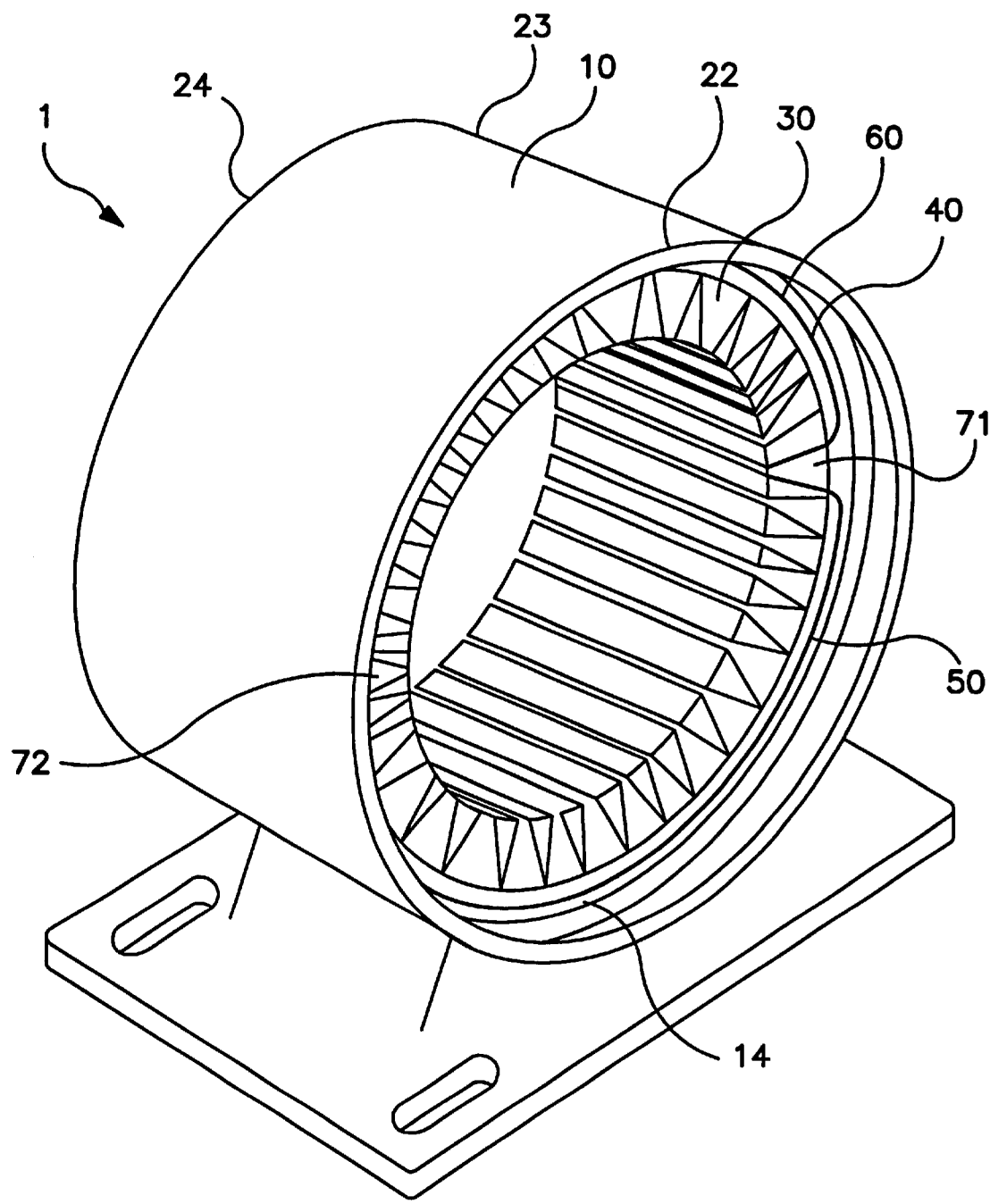
FIG. 2 illustrates a three-dimensional schematic of the coils of an induction apparatus of the present invention.

As shown in FIG. 2, stator 10 is three-dimensional, having a first end 22, a second end 24, and a longitudinal portion 23. For purposes of depicting coils 40 of the present invention, in FIG. 1, just first end 22 of stator 10 is illustrated.

FIGS. 1 and 2, for simplification of the illustration, show two coils of wire, 50 and 60. Apparatus 1, however, may include many more coils 40, for example two coils for each pair of stator slots, however, to simplify the illustration, these additional coils are not shown.

With reference FIG. 1, coils 40 include a plurality of coils, such as first coil 50 and second coil 60. Coils 50 and 60 may comprise one wire or multiple wires, that are repeatedly wrapped around stator 10, such that there is a number of turns of wire in the coil. Alternatively, coils 50 and 60 may include one wire that is wrapped into the two coils 50 and 60. Preferably, coils 50 and 60 are coupled together, such as with a wire.

The number of wires and turns in the coils may depend on the desired characteristics of the motor or other factors. In creating the turns, the coils may start, for example, at first end 22 of stator 10, then travel down the length of stator 10 (through a slot 30) and around the stator at the second end, then continue back through the length of stator 10, repeating this pattern a desired number of times. Coils 40 are thus wound around stator 10, being in slots 30, through grooves in stator 10, through drill holes in stator 10, or if there are no slots in stator 10, then by resting in airgap 25.

Coils 40 may be driven by inverters, a pure sinusoidal current, a DC current, or any other means for driving coils of a rotating induction apparatus.

First coil 50 includes a first insertion portion 52 and a second insertion portion 54. Second coil 60 includes a first insertion portion 62 and a second insertion portion 64. The terms insertion portion do not necessarily refer to the "end" of a coil, but rather, refers to the fact that this part of the coil is in a slot in the stator. Thus, first insertion portion 52 of first coil 50 is the part of first coil 50 that is in slot 30; it may or may not be an actual end of first coil 50.

Additionally, first coil 50 or second coil 60 may include a plurality of turns and wires. For example, the number of turns in a coil may be determined by the following relationship:

$$\text{Turns} = \frac{22,500,000 \times \text{coil voltage}}{\text{frequency} \times (\text{Flux}/\text{pole})/\text{coil} \times K_d \times K_s}$$

(where flux per pole is given in lines of force [$10^{-8}$ Webers], coil voltage is in volts RMS, frequency is in Hertz, Kd is the winding distribution factor [which in the present invention is 1 or about 1], and Ks is the winding chord factor [which in the present invention is 1 or about 1]). Thus, if the flux density increases, the number of turns should decrease, and if the flux density decreases, the number of turns should increase.

The coils may have a number of wires in each coil. The number of wires is determined by the desired cross-section area of copper to carry the current. This may be in the form of one thick wire or several thinner wires, such that a desired cross-sectional area of copper is obtained. The desired cross-section area of copper is determined by the current flow desired in the coils and the desired cross-sectional area per unit current. Preferably, the number of wires is ten or less. More preferably the number of wires is between four and ten, and still more preferably four wires are used in each coil. Alternatively, one wire may be used in each coil. For example, if 5.136 Amps per phase (where in the present invention each phase could have two coils) is desired, then the total cross-section area of copper should be 1284 circular mils. This may be obtained by many wires having a cumulative cross-sectional area equivalent to 1284 circular mils.

The wires in the coil are wrapped around the stator the desired number of turns. Thus each coil includes its wires wrapped around the stator a desired number of turns, creating a thick coil. For example, an eighteen phase motor, with two coils for each phase, may have fifty-nine turns in each coil, and thus one hundred and eighteen turns per each phase. Further, any reasonable wire size may be used, such as 2×22 wire.

As depicted in FIG. 1, stator 10 includes twenty-four slots. As stated above, the present invention may be used with any number of slots. Preferably, the number of slots, however, is greater than or equal to twice the number of phases. Further, it is preferable to use a stator having either twenty-four, thirty, thirty-six, forty-two, forty-eight, fifty-four, sixty, sixty-six, or seventy-two slots.

First insertion portion 52 of first coil 50 is attached to a first slot 71 and second insertion portion 54 of first coil 50 is attached to a second slot 72. The first and second slots may be referred to as a slot pair. First insertion portion 62 of second coil 60 is attached to first slot 71 and second insertion portion 64 of second coil 60 is attached to second slot 72. The first insertion portion and the second insertion portion of a coil of winding 40 should be in different slots; however, multiple first insertions portions of multiple coils may occupy the same slot.

For example, in a twenty-four slot stator with a twelve phase motor, first slot 71 may be the first slot on stator 10 and second slot 72 may be the thirteenth slot on stator 10. Preferably, first slot 71 and second slot 72 are 180° electrical degrees apart, such that, for example, if first slot 71 was the tenth slot, second slot 72 is preferably the twenty-second slot (which are 180° electrical degrees apart). For example, with a two pole, twelve phase apparatus, first slot 71 may be any slot numbered 1 to 12, and second slot 72 may be any slot numbered 13 to 24. Additionally, for example, with a two pole, N phase apparatus having 2N number of slots, first slot 71 may be any slot numbered 1 to N, and second slot 72 will be N slots away from the first slot. Additionally, for example, with a four pole, N phase apparatus having 4N number of slots, first slot 71 may be any slot numbered 1 to N, the second slot 72 will be N slots away from the first, the third slot will be a slot from (2N+1) to 3N, and the fourth slot will be N slots from the third. Regardless of the number of poles, the slots remain 180° electrical degrees apart.

According to an embodiment of the present invention, FIG. 1 illustrates that, from the perspective of looking at first end 22 of stator 10, first coil 50 is placed on the right side of stator 10 and second coil 60 is placed on the left side of stator 10. The terms left and right are with reference to an imaginary line "$C_L$" that exists between first slot 71 and second slot 72, from a view that is looking at first end 22, regardless of how the coils are wound on other sides of the stator 10. Further, imaginary line C1 is only a reference point, and may be drawn between any of the slots on stator 10, so long as imaginary line C1 divides stator 10 in half. "Left" means to the left of imaginary line "$C_L$" and "right"

means to the right of imaginary line "$C_L$". In FIG. 1, between first slot 71 and second slot 72, the right side of stator 10 is identified with an "A" and the left side of stator 10 is identified with a "B." Further, use of the terms right and left do not imply that the coils are in an arcuate pattern, but rather that the coil is left or right of imaginary line "$C_L$" between the two slots.

For additional coils used in the slots, between any two pairs of slots that are 180° electrical degrees apart, preferably half of the coils are on the right side of the imaginary line, and the other half of the coils are on the left side of the imaginary line. As stated above, this is preferably repeated for each pair of slots on stator 10.

FIG. 2 illustrates a three-dimensional schematic of the coils of an induction apparatus of the present invention. Apparatus 1 includes a stator 10 with slots 30. As shown, there are thirty-six (36) slots. Coils 40 include a first coil 50 and a second coil 60. First coil 50 and second coil 60 are both in first slot 71 (slot number one) and second slot 72 (slot number nineteen). First coil 50 is on the right of stator 10 and second coil 60 is on the left of stator 10, with respect to an imaginary line between first slot 71 and second slot 72 from the perspective of looking at first end 22 of stator 10. As can be seen in FIG. 2, coils 40 may be placed on an inside of stator 10, such as on a lip 14 of stator 10. Alternatively, coils 40 may be placed on the outside of stator 10, around slots 30, or through drill holes in the stator. Alternatively, stator 10 may have no slots, with the coils being near the surface of stator 10.

First coil 50 and second coil 60 may have an about equal number of wires and turns within first coil 50 and second coil 60. Preferably, first coil 50 and second coil 60 have an equal number of wires and turns; i.e., it is preferable to have an equal number of coils, having an equal number of wires and turns, on the left side and right side of stator 10.

Figure 3:
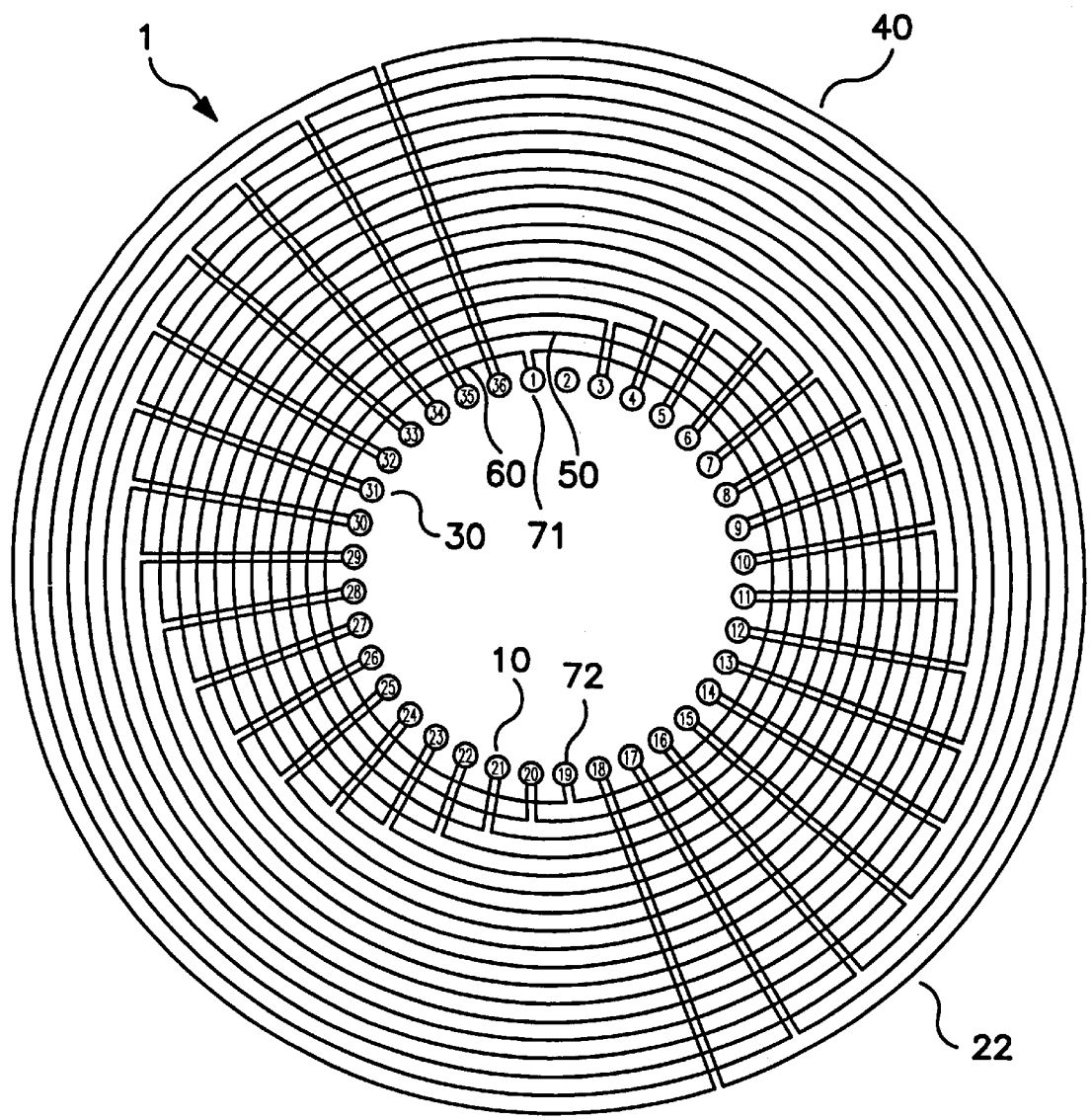
FIG. 3 illustrates a schematic of the coils according to the present invention.

FIG. 3 illustrates a schematic of the coils of apparatus 1 according to the present invention. FIG. 3 shows a simplified view of slots 30 (numbered one to thirty-six), however in this illustration, all of the coils 40 of the apparatus 1 are shown. For example, coils 40 include first coil 50 and second coil 60, which are both in first slot 71 and second slot 72. Further, first coil 50 is on the right of stator 10 and second coil is on the left of stator 10 (with respect to the imaginary line between the two slots first coil 50 and second coil 60 are in). This is repeated for each of the coils 40 in each pair of slots 30. As shown, for each pair of slots that are 180° electrical degrees apart, one coil is on the right and one coil is on the left.

Figure 4:
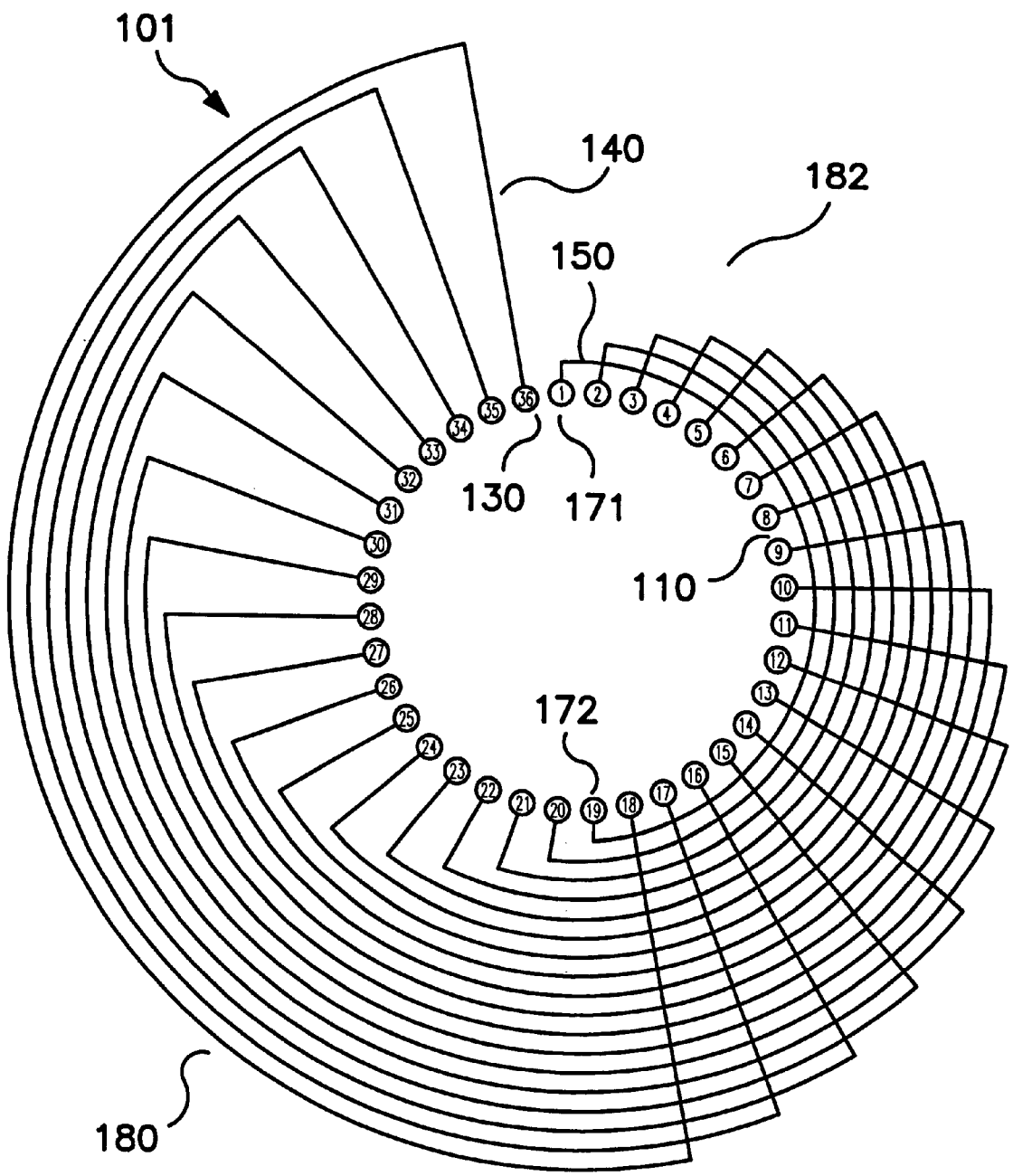
FIG. 4 illustrates a schematic of the coils of another embodiment of the present invention.

FIG. 4 illustrates a schematic of the coils of apparatus 101, which is another embodiment of the present invention. FIG. 4 shows a simplified view of slots 130 (numbered one to thirty-six). Again, the present invention may be used with any number of slots, however, thirty-six (36) is depicted in FIG. 4. In this embodiment, coils 140 are in a first slot 171 and a second slot 172, where second slot 172 is 180° electrical degrees from first slot 171.

Coils 140 includes coil 150. Coil 150 may include a plurality of wires and turns. For example, coil 150 is on the right side of stator 10, with respect to an imaginary line between first slot 171 (slot number 1) and second slot 172 (slot number 19). As shown, all of coils 140 are on the right side. Alternatively, all of coils 140 may be on the left side. However, with this embodiment, a large percentage of coils accumulate near section 180, while in section 182, there is not many coils. With reference to FIG. 3, because each of the coils 40 between each slot is divided in half, with one half on the right and one half on the left of stator 10, coils 30 take up less space around stator 10 than coils 130 around stator 110 in FIG. 4.

Figure 5:
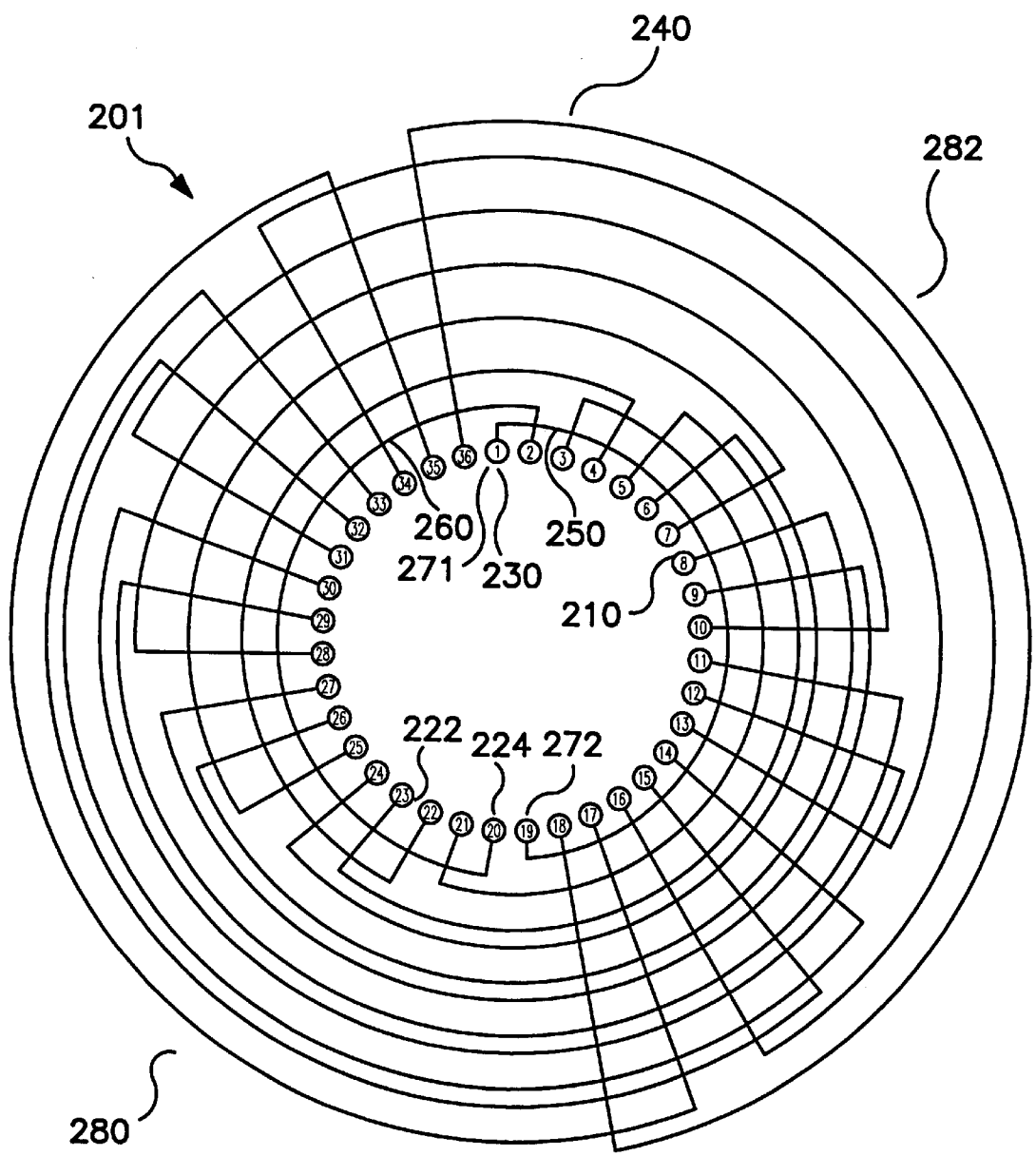
FIG. 5 illustrates a schematic of the coils of another embodiment of the present invention.

FIG. 5 illustrates a schematic of the coils of apparatus 201, which is another embodiment of the present invention. FIG. 5 shows a simplified view of slots 230 (numbered one to thirty-six). Again, the present invention may be used with any number of slots, however, thirty-six (36) is depicted in FIG. 5. In this embodiment, coils 240 travel from a first slot to a second slot, where the second slot is 180° electrical degrees from the first slot. Further, the coils in coils 240 alternate between being on the right side and being on the left side of stator 210, from the perspective of looking at first end 222 of stator 210.

Coils 240 include a first coil 250 and a second coil 260. First coil 250 and second coil 260 may include a plurality of turns and wires. Thus, for example, first coil 250 is in a first slot 271 (slot number 1) and a second slot 272 (slot number 19), while second coil 260 is in a third slot 273 (slot number 2) and a fourth slot 274 (slot number 20). Coils 240 alternate between being on a left side or being on a right side of stator 210, with respect to an imaginary line between the pairs of slots. Thus, coil 250 is on the right and coil 260 is on the left. This results in an even distribution of coils on both sides 280 and 282.

Any coil usable in stators may be used for the coils of the present invention. Further, the present invention is applicable to a variety of geometries of the rotating induction apparatus, including, for example, AC induction apparatus, and squirrel cage and wound rotor apparatus, which includes buried conductors and three phase and high phase order wound rotors. Further, the present invention is applicable to geometries in which the region of interaction between stator and rotor has circular symmetry about the axis of rotation, magnetic flux is generally normal to the region of interaction, and current flow is generally perpendicular both to flux and the direction of motion. Alternative geometries which may be utilized in the method of the present invention are axial flux, or pancake, motors, radial flux geometries in which the rotor is external to the stator, or geometries which use a combination of axial and radial flux, or multiple axial flux paths. Additionally, a dual-sided pancake stator that is surrounded on both faces by pancake rotor may be used.

Figure 6:
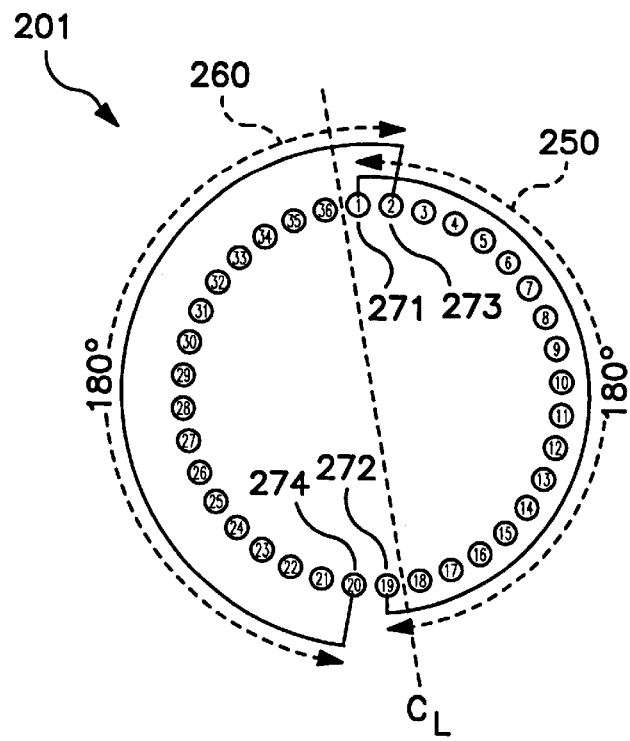
FIG. 6 illustrates a schematic of two of the coils of the embodiment of the invention described in FIG. 5.

Referring to FIG. 6, a simplified schematic of coils 201 according to the embodiment of FIG. 5, is shown, with like reference numerals referring to like elements. Further, reference line C1 of FIG. 1 is included, with first slot 271 and third slot 273 on the right side of reference line CL, and second slot 272 and fourth slot 274 on the left side of reference line CL. Moreover, as was described in reference to FIG. 5, once first coil 250 and second coil 260 are inserted in first slot 271 and third slot 273, respectively, they are wound in a direction opposite each other.

Figure 7:
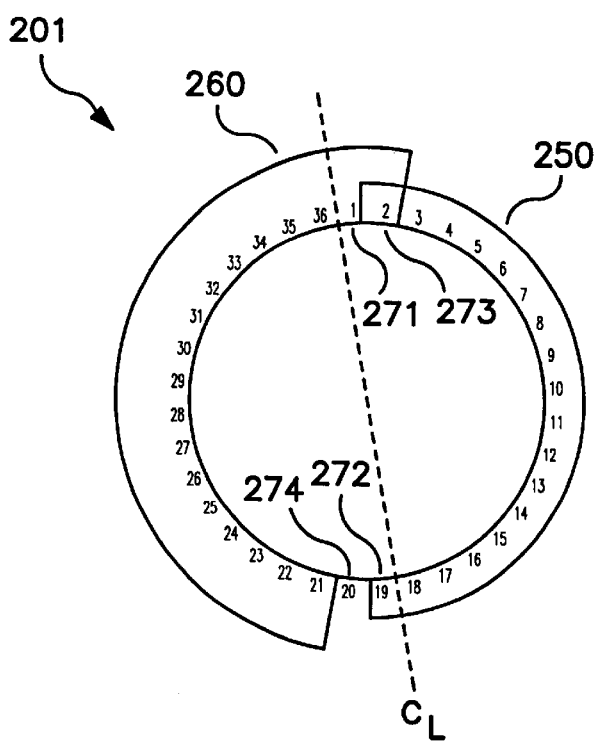
FIG. 7 illustrates a schematic of two of the coils of the embodiment of the invention described in FIG. 5, where the stator has no slots.

Referring to FIG. 7, a simplified schematic of coils 201 according to the embodiment of FIG. 5, is shown, except there are no slots, i.e., the slots have no depth and are substantially flat, and the coils are located at a position near the surface of the stator before being wound around stator 10.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

What is claimed is:

1. A method of winding an electrical rotating apparatus comprising:
   determining a desired number of phases that is output from said electrical rotating apparatus, wherein said number of phases is greater than three;
   providing a stator comprising a plurality of slot pairs, each of said slot pairs comprising a first slot and a second slot, wherein the number of said slots is greater than or equal to twice said number of phases;
   providing a rotor electromagnetically coupled to a magnetic field generated by said stator;
   providing a plurality of coils that are around said stator, wherein said coils comprise:
      a first coil coupled to a first slot pair; and
      a second coil coupled to a second slot pair, with said first slot of each slot pair being on the right side of a reference line dividing said stator in half, and said second slot of each slot pair being on the left side of said reference line, wherein when said first coil is inserted in said first slot of said first slot pair and when said second coil is inserted in said first slot of said second slot pair, said first coil and said second coil being wound around said stator in directions opposite to each other.

2. The method of claim 1, wherein said number of phases is greater than twelve.

3. The method of claim 1, wherein said number of phases is greater than eighteen.

4. The method of claim 1 with said first slot pair and said second slot pair being the same slot pair.

5. The method of claim 1, wherein said first slot of said first slot pair and said second slot of said first slot pair are 180 electrical degrees apart from each other, and said first slot of said second slot pair and said second slot of said second slot pair are 180 electrical degrees apart from each other.

6. The method of claim 1, wherein said first coil comprises at least one first wire and said second coil comprises at least one second wire.

7. The method of claim 6, wherein the number of wires in said first coil equals the number of wires in said second coil.

8. The method of claim 6, wherein said first wire is wound a plurality of turns around said stator and said second wire is wound a plurality of turns around said stator and said second coil.

9. The method of claim 8, wherein said plurality of turns is computed according to the formula:

$$\text{Turns} = \frac{22{,}500{,}000 \times \text{coil voltage}}{\text{frequency} \times (\text{Flux}/\text{pole})/\text{coil} \times K_d \times K_s}.$$

10. The method of claim 1, wherein said slots are substantially flat.

11. The method of claim 1, wherein said step of providing a plurality of coils comprises:
   providing said plurality of coils, wherein said plurality of coils comprise said first coil and said second coil, wherein said first coil and said second coil comprise a wire wound a plurality of turns such that said wire is wound into said first coil and said second coil.

12. An electrical rotating apparatus comprising:
   a number of phases, wherein said number of phases is output from said electrical rotating apparatus and said number of phases is greater than three;
   a stator comprising a plurality of slot pairs, each of said slot pairs comprising a first slot and a second slot, wherein the number of said slots is greater than or equal to twice said number of phases;
   a rotor electromagnetically coupled to a magnetic field generated by said stator; and
   a plurality of coils that are wound around said stator, wherein said coils comprise:
      a first coil coupled to a first slot pair; and
      a second coil coupled to a second slot pair, with said first slot of each slot pair being on the right side of a reference line dividing said stator in half, and said second slot of each slot pair being on the left side of said reference line, wherein when said first coil is inserted in said first slot of said first slot pair and when said second coil is inserted in said first slot of said second slot pair, said first coil and said second coil being wound around said stator in directions opposite to each other.

13. The electrical rotating apparatus of claim 12, wherein said number of phases is at least twelve.

14. The electrical rotating apparatus of claim 12, wherein said number of phases is at least eighteen.

15. The electrical rotating apparatus of claim 12, with said first slot pair and said second slot pair being the same slot pair.

16. The electrical rotating apparatus of claim 12, wherein said first slot of said first slot pair and said second slot of said first slot pair are 180 electrical degrees apart from each other, and said first slot of said second slot pair and said second slot of said second slot pair are 180 electrical degrees start from each other.

17. The electrical rotating apparatus of claim 12, wherein said apparatus has a number of poles and said number of slots is equivalent to the number of poles multiplied by the number of phases.

18. The electrical rotating apparatus of claim 12, wherein said first coil comprises a plurality of first wires and said second coil comprises a plurality of second wires.

19. The electrical rotating apparatus of claim 18, wherein the number of wires in said first coil equals the number of wires in said second coil.

20. The electrical rotating apparatus of claim 19, wherein said first wire is wound a plurality of turns around said stator and said second wire is wound a plurality of turns around said stator.

21. The electrical rotating apparatus of claim 20, wherein the number of turns in said first coil equals the number of turns in said second coil.

22. The electrical rotating apparatus of claim 20, wherein said plurality of turns of said first coil or said second coil is computed according to the formula:

$$\text{Turns} = \frac{22{,}500{,}000 \times \text{coil voltage}}{\text{frequency} \times (\text{Flux}/\text{pole})/\text{coil} \times K_d \times K_s}.$$

23. The electrical rotating apparatus of claim 12, wherein said first coil and said second coil comprise a wire that is wound into both said first coil and said second coil.

24. The electrical rotating apparatus of claim 12, wherein said apparatus is a motor.

25. The electrical rotating apparatus of claim 12, wherein said apparatus is a generator.

* * * * *